US012596552B2

(12) United States Patent
Bouzguarrou et al.

(10) Patent No.: US 12,596,552 B2
(45) Date of Patent: Apr. 7, 2026

(54) BRANCH PREDICTION BASED ON SAMPLED VALUES

(71) Applicant: Arm Limited, Cambridge (GB)

(72) Inventors: Houdhaifa Bouzguarrou, Austin, TX (US); Alexander Cole Shulyak, Austin, TX (US); Rami Mohammad Al Sheikh, Morrisville, NC (US)

(73) Assignee: Arm Limited, Cambridge (GB)

( * ) Notice: Subject to any disclaimer, the term of this patent is extended or adjusted under 35 U.S.C. 154(b) by 86 days.

(21) Appl. No.: 18/428,320

(22) Filed: Jan. 31, 2024

(65) Prior Publication Data

US 2025/0245011 A1      Jul. 31, 2025

(51) Int. Cl.
*G06F 9/38* (2018.01)

(52) U.S. Cl.
CPC ................................ *G06F 9/3844* (2013.01)

(58) Field of Classification Search
CPC .. G06F 9/3844; G06F 9/30058; G06F 9/3804; G06F 9/3806; G06F 9/3832; G06F 9/30047
See application file for complete search history.

(56) References Cited

U.S. PATENT DOCUMENTS

| | | | | |
|---|---|---|---|---|
| 5,933,618 A | * | 8/1999 | Tran ....................... | G06F 9/3863 712/213 |
| 6,000,044 A | * | 12/1999 | Chrysos ................ | G06F 11/348 714/39 |

| | | | | |
|---|---|---|---|---|
| 2007/0043934 A1 | * | 2/2007 | Sodani .................. | G06F 9/3863 712/228 |
| 2010/0262813 A1 | * | 10/2010 | Brown ................ | G06F 9/30072 712/240 |
| 2020/0004551 A1 | * | 1/2020 | Vasekin ................ | G06F 9/3861 |
| 2020/0081716 A1 | * | 3/2020 | Yalavarti ............... | G06F 9/3844 |
| 2020/0150967 A1 | * | 5/2020 | Ishii ...................... | G06F 9/3806 |
| 2021/0279063 A1 | * | 9/2021 | Vasekin ................ | G06F 9/3865 |
| 2021/0382718 A1 | * | 12/2021 | Agrawal ............. | G06F 9/30032 |
| 2023/0401135 A1 | * | 12/2023 | Chen .................... | G06F 11/3409 |

* cited by examiner

*Primary Examiner* — Jyoti Mehta
(74) *Attorney, Agent, or Firm* — NIXON & VANDERHYE P.C.

(57) ABSTRACT

An apparatus comprises sampled state storage to store sampled register values of a register operand sampled at a sampling point in program flow, and prediction circuitry. In response to a semantic branch trigger indicating that there is a future branch instruction at a point in program flow later than the sampling point which satisfies a semantic branch condition, the prediction circuitry is configured to make a determination of a branch outcome of the future branch instruction based on a sampled register value of a particular register operand. The semantic branch condition is satisfied by a given future branch instruction for which a branch outcome is dependent on a sampled register value stored in the sampled state storage, and a value that the given register operand will have when program flow reaches the given future branch instruction can be calculated deterministically based on the sampled register value of the given register operand.

20 Claims, 11 Drawing Sheets

| 800 | 802 | 1100 | | 900 | 804 | 806 |
|---|---|---|---|---|---|---|
| mispredicted instruction ID | mispred direction | operand calculation inst. | ... | intervening taken branch | future branch instruction | future branch condition |

BRANCH PREDICTION BASED ON SAMPLED VALUES

BACKGROUND

Technical Field

The present technique relates to the field of data processing. In particular, the present technique relates to branch prediction.

Technical Background

A data processing apparatus may execute branch instructions which determine which sequence of later instructions will subsequently be executed. The apparatus may have a branch predictor for making branch predictions for predicting outcomes of branch instructions during execution of a program. This allows the data processing system to speculatively fetch and execute later instructions on the flow path indicated by the predicted outcome of the branch instruction. Speculative execution of instructions in this way allows the later instructions to be executed sooner than would be possible if the data processing system was forced to wait until the outcome of the earlier branch instruction was known, which may improve the performance of the data processing system. If the prediction of the outcome of a branch instruction is later determined to have been incorrect, the later instructions executed from the incorrect path are flushed from the pipeline of the data processing system, with the data processing system then executing instructions on the correct control flow path.

It is desirable to develop prediction mechanisms that increase the accuracy of prediction of the outcome of branch instructions, as the more accurately the prediction mechanism operates, the less need there will be to flush instructions from the pipeline, and hence the performance impact of incorrect predictions will be reduced.

SUMMARY

At least some examples of the present technique provide an apparatus, comprising:

sampled state storage configured to store sampled values of at least one register operand sampled at a sampling point in program flow; and prediction circuitry, wherein in response to a semantic branch trigger indicating that there is a future branch instruction at a point in program flow later than the sampling point which satisfies a semantic branch condition, the prediction circuitry is configured to make a determination of the branch outcome of the future branch instruction based on the sampled value of a particular register operand, wherein the semantic branch condition is satisfied by a future branch instruction for which:

a branch outcome of the future branch instruction is dependent on the particular register operand which is one of the at least one register operands for which a sampled value is stored in the sampled state storage, and a value that the particular register operand will have when program flow reaches the future branch instruction can be determined based on the sampled value of the particular register operand sampled at the sampling point.

At least some examples provide a method, comprising:

storing sampled values of at least one register operand sampled at a sampling point in program flow; and in response to a semantic branch trigger indicating that there is a future branch instruction at a point in program flow later than the sampling point which satisfies a semantic branch condition, making a determination of the branch outcome of the future branch instruction based on the sampled value of a particular register operand, wherein the semantic branch condition is satisfied by a future branch instruction for which:

a branch outcome of the future branch instruction is dependent on the particular register operand which is one of the at least one register operands for which a sampled value is stored in the sampled state storage, and a value that the particular register operand will have when program flow reaches the future branch instruction can be determined based on the sampled value of the particular register operand sampled at the sampling point.

Further aspects, features and advantages of the present technique will be apparent from the following description of examples, which is to be read in conjunction with the accompanying drawings.

DESCRIPTION OF EXAMPLES

Figure 1:
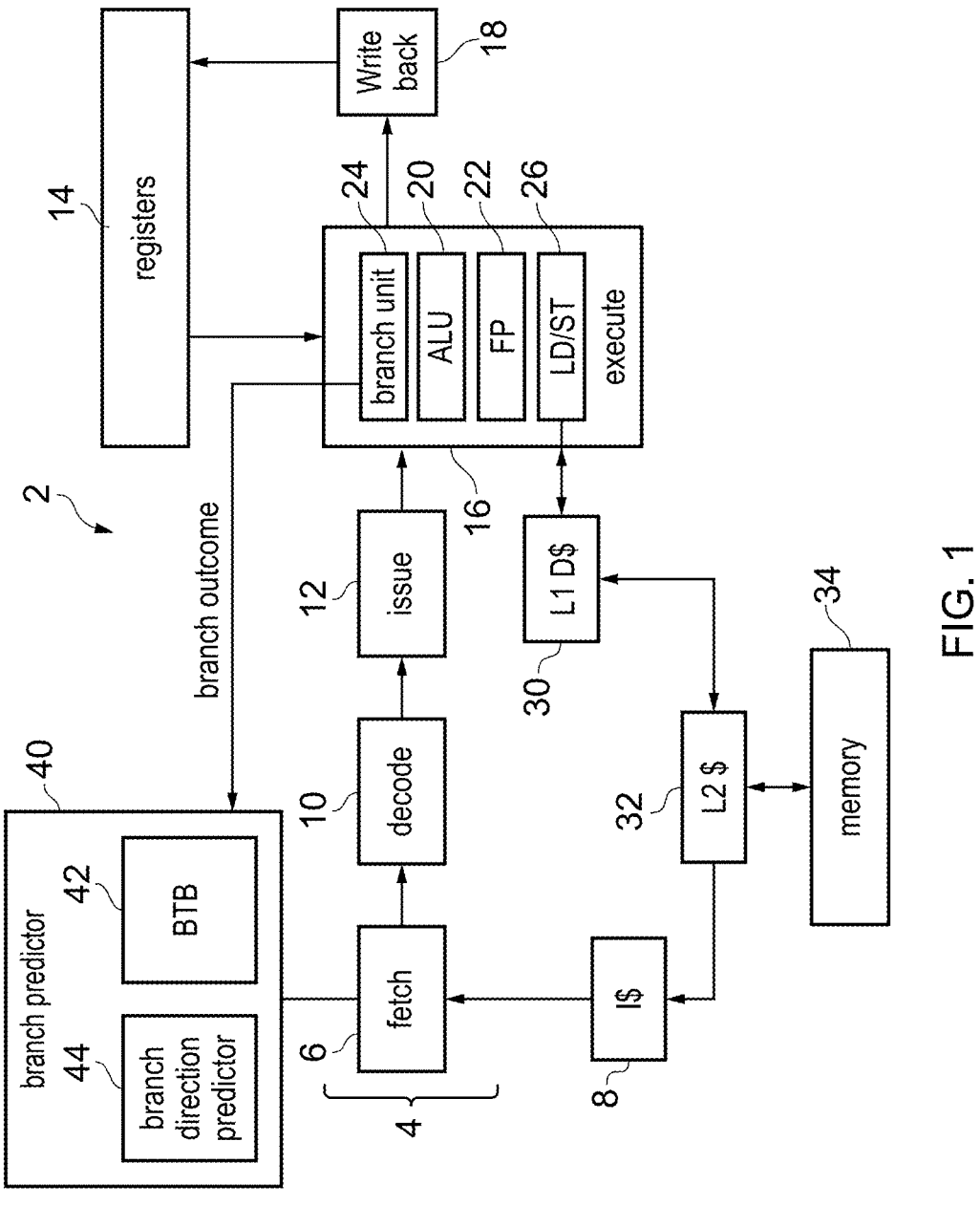
FIG. 1 schematically illustrates an example of a data processing apparatus according to the present technique.

The outcome of a branch instruction may depend on one or more values stored in register storage, which may or may not be explicitly specified by that branch instruction. For example, the outcome of certain branch instructions may depend on a control operand stored in a control register. In other examples, the outcome of a branch instruction may depend on an operand stored in a general purpose register, for example a general purpose register specified by the branch instruction. If the outcome of a branch instruction depends on register operands, then accurate predictions could be made regarding the outcome of the branch instruction if it could be known at the time of prediction what values those register operands would have at the time the branch instruction is executed.

One approach to predicting the outcome of a branch instruction could involve sampling the values of registers upon which the outcome of the branch instruction depends at the time of prediction. However, prediction of the outcome of a branch instruction typically takes place many processing cycles before that instruction is executed, with many other instructions executed between prediction and execution of a particular branch instruction. The prediction stage may operate ahead of the execution stage by tens or hundreds of instructions, for example. This means that the values of the register operands at the time of prediction generally vary significantly from the values of those register operands at the later point when the instruction is executed, meaning that it is typically difficult to make accurate predictions about whether a branch will be taken or not taken (predict the branch outcome) based on sampling the current values of register operands at the time of prediction.

The inventors have realised, however, that there are certain points in program flow where the prediction and execution stages become separated by much fewer instructions. For example, as will be discussed below, this may happen following misprediction of a branch instruction leading to the pipeline being flushed. For a period following a pipeline flush, or at other times during processing, there may be relatively few instructions between the prediction and execution stages. Situations where there are a reduced number of instructions between prediction and execution present an opportunity to use values of register operands sampled at the point of prediction to make accurate predictions for upcoming branch instructions, because it is much more likely that sampled values of register operands will be related to the future values of the register operands when the branch instruction is executed, and therefore related to the outcome of the branch instruction, since there are fewer intervening instructions which may update those register operands in the period between prediction and execution.

An apparatus according to the present technique comprises sampled state storage configured to store sampled values of at least one register operand sampled at a sampling point in program flow. To reduce hardware overhead, the sampling may be performed by existing circuitry which already accesses the registers to obtain values of register operands (such as the execute stage of a processing pipeline), although in other examples dedicated hardware may be provided to sample register operands.

The apparatus also comprises prediction circuitry to make a prediction in respect of a branch instruction. The prediction circuitry is configured to make a determination of a branch outcome (whether the branch is taken or not taken) of a future branch instruction at a point in program flow later than the sampling point, where the determination is based on the sampled value of a particular register operand, in response to a semantic branch trigger indicating that the future branch instruction satisfies a semantic branch condition. As will be discussed, there may be several ways in which a semantic branch trigger is issued, and several ways in which the sampled values are used to make a determination of a branch outcome.

The semantic branch condition is satisfied by a future branch instruction for which: a branch outcome of the future branch instruction is dependent on the particular register operand which is one of the at least one register operands for which a sampled value is stored in the sampled state storage, and a value that the particular register operand will have when program flow reaches the future branch instruction can be determined based on the sampled value of the particular register operand sampled at the sampling point. In other words, the semantic branch condition is satisfied for a branch instruction whose outcome can be determined based on sampled state sampled at the earlier sampling point. The path between the sampling point and a future branch instruction satisfying the semantic branch condition may be described as deterministic, because the value of the particular register operand at the time the branch instruction is executed can be determined based on the values of the register operands sampled at the point of prediction, in contrast to a path which depends on external values such as loaded values which may affect the register operands (in a way which cannot be determined without actually loading those values).

Branch predictions based on sampled register state can have very high accuracy when triggered by a semantic branch trigger, since the prediction is based on the actual values of the register operands which determine the branch direction for that instance of the instruction. Hence, the prediction circuitry proposed herein can reduce the number of mispredictions and therefore improve performance of a processing apparatus.

There are several ways that sampling of register operands may be triggered. In some examples sampling may be a regular event, e.g., occurring every time an instruction is executed. In other examples, which enable storage and sampling overhead to be reduced, sampling may be triggered to occur when it is expected that those sampled values may be useful for making branch predictions, such as when a separation (a number of intervening instructions) between the execute and predict stages of a pipeline is anticipated to be small. In some examples sampling of the at least one register operand is triggered by misprediction of a first branch instruction. Following a misprediction, the processing pipeline is flushed meaning that there are very few intervening instructions between the execute stage and the instructions at the predict stage. This means that the instructions at the predict stage are more likely to have outcomes which depend on current values of the registers or values which can be determined from current values of the registers, and hence sampling those register operands may enable accurate predictions to be made at the prediction stage.

As sampling of register values can enable very accurate predictions to be made for subsequent branch instructions, then sampling the register values on a branch misprediction can reduce the likelihood of making two mispredictions back to back (because misprediction of a first branch instruction leads to a situation in which an accurate prediction can be made for the second branch prediction). Hence, sampling register values in response to misprediction of a first branch instruction can reduce the likelihood of back-to-back mispredictions of branch instructions.

In some examples, all of the register operands in a system may be sampled. However, this may lead to an unnecessarily large amount of data being sampled. In other examples, a subset of register operands may be selected for sampling. The subset may include registers upon which branch instructions commonly depend (e.g., a control register such as the current program status register), and/or could include a subset of registers chosen based on the current sampling point.

For example, where misprediction of a first branch instruction triggers a sampling point, then the sampled state may include the register operands upon which the first branch instruction depended. This is because the first and future branch instructions may both depend on the same register operand, and therefore sampling the register operands of the first branch instruction may enable effective prediction of the further branch instruction. For example, a reasonably common sequence of branch instructions may include two or more branch instructions which depend on the same register operands. For example a first instruction may set a condition flag and then two or more separate branch instructions may provide branch destinations for different outcomes of the first instruction (e.g., a compare instruction followed by a branch if greater than instruction and a branch if less than instruction, both depending on the same condition register). In such a sequence of code, the branch outcome of the second branch instruction can be determined using the register state used for the first branch instruction. Therefore, if the register state is sampled following misprediction of the first branch instruction, then the branch outcome of the subsequent branch instruction can be predicted based on that sampled register state. Hence, it can be particularly effective to select as the at least one sampled register operand a register operand of a first mispredicted branch instruction.

As mentioned previously, the outcome of certain branch instructions may depend on a control operand stored in a control register (or status register). Certain instructions may cause control operands such as condition flags to be set in a status register. For example, a compare instruction may cause a status flag to be set to indicate the result of a comparison, and then subsequent instructions may reference the status register to control their behaviour. As branch instructions may have a branch outcome which depends on a value in a control register, then in some examples the sampled state storage is configured to store sampled values of at least one status register, to enable such branch instructions to be predicted in response to a semantic branch trigger. The control register may not be explicitly specified by the branch instruction, but may nevertheless be considered an operand of that instruction.

In some examples, the sampled state storage may also or alternatively be configured to store sampled values of at least one general purpose register. Many instructions which do not cause status registers to be updated may output results to a general purpose register, and certain branch instructions may have an outcome which depends on a value of a general purpose register. For example, a compare and branch if zero instruction, or test bit and branch if non-zero instruction may have outcomes which depend on a value in a general purpose register. Therefore, sampling general purpose registers may enable predictions to be made in response to a semantic branch trigger. Because there are several general purpose registers which may be used by instructions, the branch instruction may explicitly specify a general purpose register used as an operand of that instruction.

As mentioned above, in some examples a subset of register operands may be selected for sampling. In some examples, the subset may include at least one of: a source register and destination register of an instruction preceding the sampling point in the program flow. The registers used as sources or destinations of earlier instructions are likely to be registers which are relevant to a subsequent section of code, and therefore may be registers upon which the outcome of an upcoming branch instruction depends. Hence, sampling these registers may mean that a register operand relevant for predicting the outcome of a future branch instruction is sampled, and therefore provides an effective mechanism for sampling register operands to enable prediction in response to a semantic branch trigger.

The semantic branch trigger may be issued in several ways, as there may be several different ways of determining that a future branch instruction satisfies a semantic branch condition.

In some examples, the apparatus comprises decoding circuitry configured to decode a series of instructions following the sampling point in program flow. For example, the series of instructions may be fetched after the sampling point and decoded by the decoding circuitry. In some examples, the decoding circuitry may be at an earlier stage of processing than other decoding circuitry provided by the apparatus, as discussed below. The decoding circuitry may analyse the decoded series of instructions to make a determination of whether the series of instructions comprises a future branch instruction satisfying the semantic branch condition.

For example, the decoding circuitry may look for a branch instruction following the sampling point which has a branch outcome which depends on a register operand sampled at the sampling point, where the value of the operand at the point in program flow comprising the branch instruction can be determined from the sampled value. This could be implemented in various ways, but in general the decoding circuitry may step through the series of instructions testing whether the condition is satisfied for any branch instruction encountered. As the distance from the sampling point increases it may become less likely that a branch instruction satisfying the semantic branch condition will be encountered (as the register operands are more likely to be updated by intervening instructions and therefore the values at the time of execution of a later instruction are less likely to be related to the sampled value than at the time of execution of an earlier instruction) and therefore the decoding circuitry may analyse a certain number of instructions following the sampling point, stopping after a certain number of instructions.

The decoding circuitry (also referred to as early decode circuitry) may be configured to issue/trigger the semantic branch trigger in response to determining that the series of instructions comprises a future branch instruction satisfying the semantic branch condition. The decoding circuitry may identify the future branch instruction to the prediction circuitry to enable a prediction to be made based on the sampled register operands.

In some examples, the decode circuitry may decode instructions at a stage of a processing pipeline preceding the execute stage of the processing pipeline. In response to the decode circuitry detecting the semantic branch condition and triggering the semantic branch trigger, the prediction circuitry may make a prediction in respect of the future branch instruction based on the sampled register state. Prior to the prediction based on sampled register state, the future branch instruction may have already been predicted using a different prediction mechanism (e.g., TAGE prediction), on the basis of which instructions may have already been fetched into the processing pipeline after the future branch instruction. However, as the sampled state prediction may be considered to be the more accurate prediction, then in response to determining that the predicted outcome of the future branch instruction based on the two prediction mechanisms disagree (and therefore that instructions previously fetched into the pipeline are on the incorrect path), the decoding circuitry may trigger a flush of the pipeline to flush instructions fetched after the future branch instruction. Instructions may then be fetched on the basis of the more accurate prediction provided based on the sampled register operands. By flushing the pipeline at the early decode stage rather than at the execute stage when it is determined that the prediction was incorrect, the performance impact of the misprediction is reduced. Therefore the more accurate prediction mechanism can be used to pre-emptively correct mispredictions in the pipeline to improve performance.

In some examples, the apparatus may comprise a semantic prediction cache configured to store at least one semantic prediction entry identifying a first branch instruction and a future branch instruction, wherein the outcome of the future branch instruction can be determined based on sampled values of at least one register operand sampled in response to misprediction of the first branch instruction. As discussed below, the semantic prediction cache may be populated based on previously observed sequences of instructions (and/or pre-populated with entries on initialization), which can enable future branch instructions to be identified when it is anticipated that the future branch instruction will follow a first branch instruction. The semantic prediction cache can provide an alternative or additional mechanism by which to trigger the semantic branch trigger, as it can enable a future branch instruction satisfying the semantic branch condition to be identified based on occurrence of the first branch instruction.

In some examples, the apparatus comprises lookup circuitry configured to perform a lookup in the semantic prediction cache in response to misprediction of a first branch instruction. The lookup may seek to identify an entry having a first branch instruction matching the mispredicted branch instruction, and the lookup circuitry may be configured to trigger the semantic branch trigger in response to the lookup hitting in the semantic prediction cache. The lookup may, for example, be performed based on an address of the first branch instruction (e.g., the current address indicated by the program counter).

The lookup in the semantic prediction cache provides a mechanism by which a branch instruction satisfying the semantic branch condition can be identified early in a processing pipeline. The entry in the semantic prediction cache indicates that occurrence of a misprediction of the branch instruction at a particular address is anticipated to be followed by a future branch instruction satisfying the semantic branch condition, and therefore the hit in the entry allows the future branch instruction to be anticipated even before it has been decoded by decoding circuitry (and therefore earlier than the example discussed above in which the trigger is issued by the decoding circuitry). Identifying the future branch instruction early means that a prediction can be made and instructions fetched into the pipeline based on the more accurate prediction, so that a pipeline flush is not necessary (compared to examples where the sampled state prediction is made later than predictions using other mechanisms, discussed above), further improving performance.

The semantic branch prediction cache may, in addition to identifying the future branch instruction for which a prediction can be made based on state sampled on misprediction of the first branch instruction, also indicate which register operands should be sampled to enable the future branch instruction to be predicted.

As mentioned above, the entries in the semantic prediction cache may be populated based on observed sequences of first and further branch instructions. This provides a mechanism by which the entries in the semantic prediction cache remain useful for making predictions in a currently executed section of code without being updated by software. Therefore, some examples comprise decoding circuitry configured to decode a series of instructions of a program and make a determination of whether the series of instructions comprises a first branch instruction followed by a future branch instruction which, for a sampling point occurring on program flow reaching the first branch instruction, satisfies the semantic branch condition, and wherein the decoding circuitry is configured to update the semantic prediction cache in response to determining that the series of instructions comprises said first branch instruction followed by said future branch instruction. The decoding circuitry for updating the prediction cache may be the same as the decoding circuitry discussed above for issuing the semantic branch trigger. In other examples the decoding circuitry may differ, for example if the semantic prediction cache is provided instead of a mechanism for triggering the semantic branch trigger based on decoded instructions. The semantic prediction cache may be updated by creating a new entry in the prediction cache, the new entry identifying the first and future instructions and any further information which may be relevant in making a prediction in respect of the future branch instruction. Cache replacement policies may be employed to select a victim entry for replacement with the new entry if the semantic prediction cache has no free entries.

In some examples, an encoding of the semantic prediction entry may enable indication of intervening taken branches occurring between the first branch instruction and the future branch instruction in program flow. The future branch instruction satisfying the semantic branch condition may not be the first branch instruction following the mispredicted branch instruction. Therefore, allowing indication of intervening branch instructions enables correct fetching of subsequent instructions because it can be determined which instruction is the instruction for which the prediction is to be made based on the sampled state.

A branch outcome may not be directly dependent on a sampled register operand, but the branch outcome of the branch instruction may still be determined using the sampled register operand. For example, the branch outcome may be determined based on a manipulated value of a sampled register operand, where the manipulation can be determined based on the series of instructions between the sampling point and the future branch instruction without requiring an external value. For example, a future branch instruction may be dependent on a value which is based on a combination of sampled register operands, or based on the combination of a sampled register operand with an immediate value indicated in the encoding of an instruction, so that knowing the sampled register values enables calculation of the values that will be had by those register operands at the time the future branch instruction is executed. Coverage of the predictor may therefore be increased in some examples by allowing predictions to be made based on manipulated sampled values. Therefore, some examples may comprise value manipulation circuitry to manipulate the sampled values of the at least one register operand to determine that the particular register operand will have when program flow reached the future branch instruction.

In some examples, the value manipulation circuitry comprises at least one of: logical shift logic (which can be used to perform multiplications and divisions by powers of 2), and addition/subtraction logic. Providing value manipulation circuitry can increase predictor coverage, but can also increase overhead of the predictor due to the high power and area requirements associated with circuitry for performing certain value manipulation operations. The inventors have found that providing relatively simple manipulation logic such as logical shift or arithmetic logic can provide useful manipulation of sampled register values whilst reducing the additional overhead requirements.

In some examples comprising a semantic prediction cache, the encoding of the semantic prediction cache entries may enable indication of at least one manipulation to be performed by the value manipulation circuitry on the sampled register operands. Therefore, without needing to decode the future branch instruction (or the series of intervening instructions), after reaching the sampling point the predictor may be provided with sufficient information from the semantic predictor entries to identify a future branch instruction and perform calculations to obtain the values that will be had by sampled register operands at the time the future branch instruction is executed, to enable an accurate prediction to be made in respect of the future branch instruction at an early stage in the processing pipeline.

In some examples, the prediction circuitry is configured to make a determination of the branch outcome of the future branch instruction based on a sampled value of a single register operand. This provides a particularly simple mechanism by which the predictor can predict the outcome of a particular branch instruction. However, recognising that there may be branch instructions for which the outcome depends on more than one register operand, in some examples the prediction circuitry may also be configured to make a determination of the branch outcome of a future branch instruction based on sampled values of a plurality of register operands.

Examples will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8, a decode stage 10 for decoding the fetched program instructions to generate micro-operations to be processed by remaining stages of the pipeline, an issue stage 12 for checking whether operands required for the micro-operations are available in a register file 14 and issuing micro-operations for execution once the required operands for a given micro-operation are available, an execute stage 16 for executing data processing operations corresponding to the micro-operations by processing operands read from the register file 14 to generate result values, and a writeback stage 18 for writing the results of the processing back to the register file 14. It will be appreciated that this is merely one example of a possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14, a floating point unit 22 for performing operations on floating-point values, a branch unit 24 for evaluating the outcome of branch operations and adjusting the program counter which represents the current point of execution accordingly, and a load/store unit 26 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing units 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions. The branch predictor is looked up based on addresses of instructions provided by the fetch stage 6 and provides a prediction on whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

Figure 2:
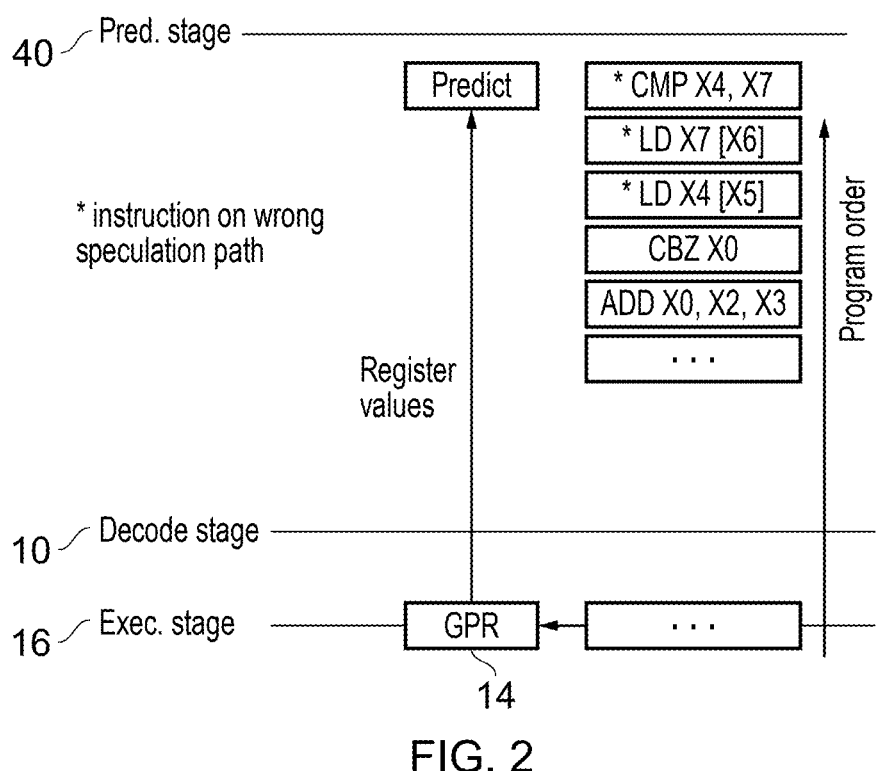
FIGS. 2 and 3 schematically illustrate a series of instructions passing through a processing pipeline.

FIG. 2 schematically illustrates a series of instructions passing through the processing pipeline 4. FIG. 2 shows the prediction stage 40, decode stage 10, and execute stage 16. Registers 14 are shown at the execute stage 16, storing register operands upon which the outcome of branch instructions may depend. An example series of instructions is shown on the right hand side of FIG. 2, and it will be appreciated that the instructions logically progress through the stages in a downwards direction (corresponding to a rightwards direction in FIG. 1) starting at prediction 40 and ending at execute 16. As shown by the number of in-flight instructions between the prediction stage and the execute stage, the prediction stage 40 may operate many instructions ahead of the execute stage 16. Only a handful of instructions are illustrated for clarity, but in practice there may be tens or hundreds of instructions in-flight. Many branch instructions have an outcome which depends on values of operands stored in the registers 14, and the inventors have recognised that sampling register operands provides an opportunity to make accurate branch predictions. However, the delay between the prediction and execute stages can lead to difficulties in using sampled register values for prediction as illustrated below.

The instruction CBZ X0 shown in FIG. 2 is a conditional branch instruction, the outcome of which depends on the value of a register operand stored in the registers 14. In particular CBZ is a compare and branch if zero instruction, which will test the value in the register X0 and, only if that value is zero, will branch to a destination indicated in the instruction. At the time the CBZ instruction reaches the prediction stage, the value of register operand X0 is unlikely to be related to the value that X0 will take when the CBZ instruction reaches the execute stage 16. As shown, an instruction which executed after the outcome of CBZ has been predicted may update the value of X0 after CBZ is predicted and before CBZ is executed (in FIG. 2 this is shown as the ADD instruction which updates X0). Generally, the large number of intervening instructions between prediction and execution means that the likelihood of the registers being updated between predicting the outcome of an instruction and that instruction being executed is high, so making a prediction based on the values taken by the registers at prediction time would generally lack accuracy, as those values are typically unrelated to the values of the operands when the instruction is taken. Hence, other prediction mechanisms (such as a TAGE predictor) may be used to predict whether CBZ will be taken or not taken.

Figure 3:
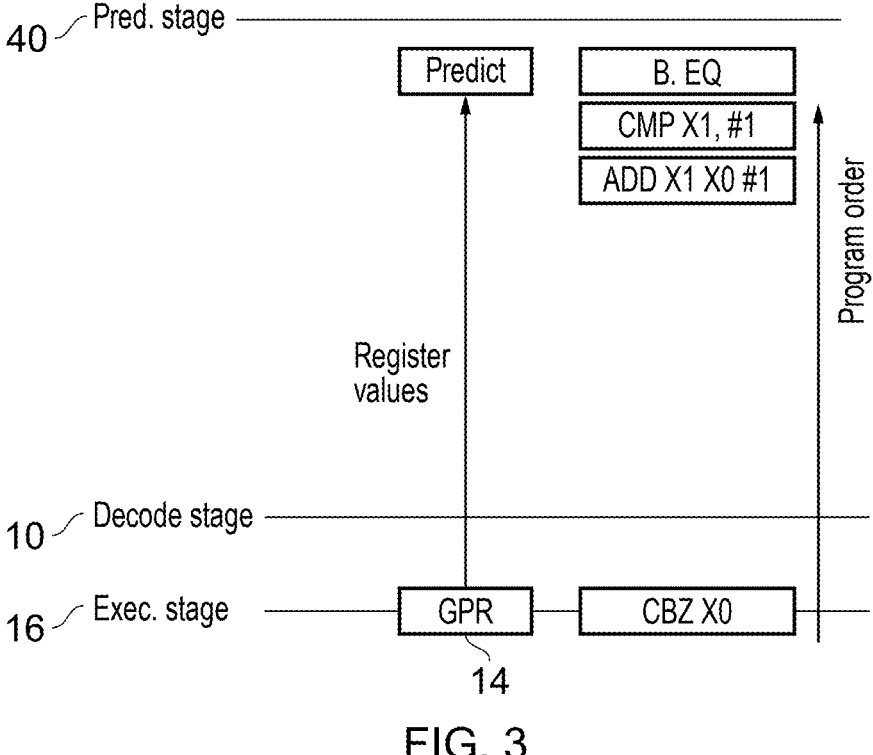

If the instruction CBZ is predicted incorrectly, then the instructions fly fetched into the pipeline after CBZ are on the wrong path. When it is determined that the outcome of CBZ was predicted incorrectly (e.g., when CBZ reaches the execute stage), then these instructions will be flushed from the pipeline and subsequent instructions will be fetched instead. Following such a pipeline flush, the prediction stage and the execute stage are synchronized as there are no intervening instructions, as shown in FIG. 3 (note that the instructions following CBZ in FIG. 3 are different from those shown in FIG. 2, as the instructions belong to different paths corresponding to different branch directions of instruction CBZ due to the initial misprediction of CBZ). At this point, following the pipeline flush following misprediction of CBZ X0, the values of the registers 14 at the time of prediction of an instruction are much more likely to be related to their values at execution of that instruction, since there are few intervening instructions. Hence, the inventors have realised that this window of time (before prediction once again gets far ahead of execution) provides an opportunity to make predictions in respect of a future branch instruction based on sampled register operand values.

For example, FIG. 3 shows the future branch instructions B.EQ (branch if equal), the outcome of which depends on a control value in a control register (e.g., the zero flag in the current program status register CPSR). The flag will be set by the preceding compare instruction CMP X1, #1, whose outcome depends on the value of the register X1. The value of X1 in turn depends on the value of X0, as it is calculated by adding an immediate value to X0. Hence, if the value of X0 is known at the time of predicting B.EQ then the value of X1 can be calculated and therefore the direction of B.EQ can be determined. Therefore, misprediction of the first branch instruction CBZ X0 provides an opportunity to make an accurate prediction for the future branch instruction B.EQ. The inventors have realised that the techniques describes herein can reduce back-to-back misprediction of such pairs of branch instructions, because misprediction of the first branch instruction provides the opportunity to make an accurate prediction for the future branch instruction.

Figure 4:
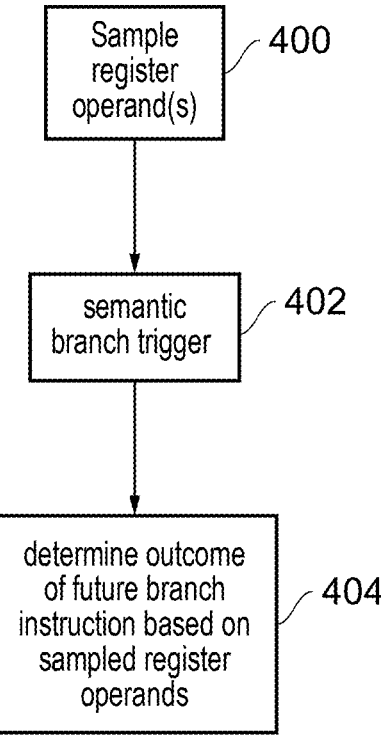
FIG. 4 illustrates a method of prediction according to the present technique.

FIG. 4 illustrates a method for making a prediction based on sampled register operands. At step 400, one or more register operands are sampled at a sample point. The sample point may occur regularly, randomly, or in response to a processing event. In examples discussed below, the sample point may be triggered by misprediction of a branch instruction. Which register operands are sampled is not particularly limited, although generally a selection of a limited number of register operands is made to reduce overhead associated with storing the sampled values. In some examples, the selection of sampled register operands may be indicated by the sampling point trigger, to allow a selection of register operands to be made which is anticipated to be most helpful for predicting a future branch instruction. Dedicated circuitry may be provided for sampling the register operands from the registers 14, however in other examples circuitry which already reads register values (such as the execute unit 16) may be reused to provide the sampled register operand values to the sampled state storage. In some examples, the sampled values are values which are source or destination operands of an earlier instruction (e.g., the branch instruction which caused the sampling to be triggered) and therefore these register operands may have already been accessed by the execute circuitry 16, and therefore may be provided to the sampled state storage without requiring a further access to the register file.

At step 402, prediction circuitry 40 detects a semantic branch trigger. The trigger may be detected in various ways, such as by detecting a value being set in a register or a message being transmitted to the prediction circuitry. As discussed below, there are several ways that a semantic branch trigger may be issued. In some examples the semantic branch trigger may be issued by decoding circuitry 10 in response to detecting a particular sequence of instruction. In some examples the semantic branch trigger may be issued in response to identifying an entry in a cache which corresponds to a mispredicted branch instruction. In either case, the semantic branch trigger indicates that there is a future branch instruction having a branch outcome which depends on sampled register operands (sampled at step 400) for which the value of that register operand at the time that the future branch instruction will be executed can be determined based on the value that was sampled at step 400. Examples will be shown below, but the future branch instruction may for example depend on the same register as a previous branch instruction which was mispredicted and triggered the register operands to be sampled.

At step 404, the branch outcome of the future branch instruction (whether that future branch instruction is taken or not taken) is predicted based on the one or more sampled register operands upon which the outcome of the future branch instruction depends. To enable the prediction to be made, in some examples the sampled value(s) of the register operands may be subjected to manipulation, such as by adding or subtracting an immediate value, to determine what value that operand will have when the future branch instruction is executed, to enable an accurate prediction to be made.

Therefore, FIG. 4 shows how the outcome of a future branch instruction can be predicted based on sampled register operands. Although the values of register operands at the time of prediction are typically too unrelated to the register values at the time of instruction execution to enable prediction, the semantic branch trigger can be used to identify periods of processing where prediction and execution are sufficiently close to enable sampled register values to be used for prediction. The method shown in FIG. 4 provides an accurate prediction mechanism which can improve performance of data processing systems.

Shown below are examples of code segments for which the method shown in FIG. 4 can be used to make a prediction of a branch outcome.

In a first example, a code segment may include two branch instructions which share a condition flag:

```
LDR x9, [x1, #0]
LDR x10, [x8, #0x10]
LDR x11, [x9, #0x10]
CMP x10,x11
B.GE 0x403eb8 (mispred—sample CPSR)
B.LE 0x403ec4 (predicted using sampled CPSR)
```

The condition flag is a value in a control register (e.g., the current program status register CPSR) which indicates the outcome of a previous instruction (such as the compare instruction CMP). In the code segment shown above, register sampling is triggered in response to misprediction of the first branch instruction (B.GE, a branch if greater than instruction which is taken if the condition flag indicates that the previous comparison determined that the value in register x10 was greater than the value in x11), which causes the CPSR to be sampled. As the future branch instruction B.LE (a branch if less than instruction) has an outcome which depends on CPSR, and the CPSR will have the same value at the time of execution of B.LE that it has when B.GE is mispredicted (and therefore the state is sampled), then sampling of CPSR on misprediction of B.LE allows an accurate prediction to be made for the outcome of B.LE.

Note that B.LE can be predicted because the pipeline was flushed after misprediction of B.GE. The code segment above shows the executed instructions, and does not show the incorrect path which would have been fetched after B.GE and which would have been flushed from the pipeline. If B.GE had not been mispredicted (and B.LE were fetched after B.GE) then sampling CPSR at the time of prediction of B.LE would not have provided an accurate prediction because the CPSR value at that time would have been subject to significant change before B.LE (and B.GE) reached the execution stage.

In a second example, the first and second branch instructions may share the same operand in a general purpose register:

ADD w21,w21, #1
    CBZ x8, 0x9de5d8 (mispred—sample x8)
    TBNZ x8, #0,0x9de5a0 (predicted using sampled value of x8)

CBZ is a branch instruction which checks the value of the register x8 and branches if that value is zero (the branch target address is indicated as 0x9de5d8). TBNZ is a branch instruction which tests a bit in a register and branches to the target address (0x9de5a0) if that bit is non-zero. In the above segment, CBZ is mispredicted meaning that a series of incorrect instructions (not shown) are fetched into the pipeline after CBZ. Upon determination that CBZ is mispredicted, the pipeline is flushed and the correct path (which includes TBNZ) is fetched. When CBZ is mispredicted, the source register x8 is sampled. As TBNZ is only fetched upon misprediction of CBZ, it reaches the prediction stage after x8 has been sampled. TBNZ has a branch outcome which depends on x8, and because there are no intervening instructions it can be determined that x8 will still have the same value when TBNZ is executed. Therefore, the prediction of TBNZ can be made using the sampled value of x8 and therefore the direction of TBNZ can be made with very high accuracy. If at the time the accurate prediction is made for TBNZ, instructions have already been fetched based on a different prediction of the outcome of TBNZ (e.g., provided by a faster prediction mechanism) then these instructions may be flushed from the pipeline and instructions based on the sampled state prediction may be fetched instead. However, in some examples the prediction of TBNZ may have been made quickly after CBZ mispredicted (e.g., because a semantic prediction cache was used) in which case the first instructions fetched may be fetched on the basis of the accurate prediction of TBNZ.

A third example shows a similar sequence of instructions, but shows that intervening instructions are permitted:

B 0x9de4d8
    CBZ x8, 0x9de628
    STR x10, [sp, #8]
    TBNZ x8, #0,0x9de4fc

A fourth example shows that the first and second branch instructions may share the same operand indirectly, and that value manipulation is permitted so that sampled values can be manipulated to obtain a value which will be taken by the relevant register operands when the instruction to be predicted is executed, and therefore using which the prediction can be made.

CMP x24,x25
    B.CC 0x400000124268 (mispredicted, sample x24 and x25)
    LDP w8,w9, [x24, #0]
    ORR w8,w9,w8
    TST w8, #0x80808080
    B.NE 0x400000124284
    ADD x24,x24, #8 (add 8 to the sampled value of x24)
    CMP x24,x25 (compare x24 and x25)
    B.CC 0x400000124268 (use result of comparison to predict B.CC)

The fourth example shows that intervening branch instructions (B.NE—branch if not equal) are permitted between the mispredicted first branch instruction (B.CC—branch if carry is clear) and the future branch instruction (the second B.CC) for which the prediction is made based on the sampled register operands. The example also shows that operations such as add and compare can be performed on the sampled operands to determine what values those operands will have when the subsequent branch instruction is executed. As above, the sequence shown from LDP-B.CC will only be fetched after misprediction of the first B.CC, and that is why the values sampled on misprediction of the first B.CC can be used for the prediction. If the following sequence were on the correct path, then values sampled at the time of prediction would not be the values encountered by the first B.CC (they would be unrelated values used for much earlier instructions due to the delay between prediction and execution).

It will be appreciated that the examples discussed above are non-limiting, and there are many other situations in which sampling of register operands can enable accurate predictions to be made for future branch instructions.

Figure 5:
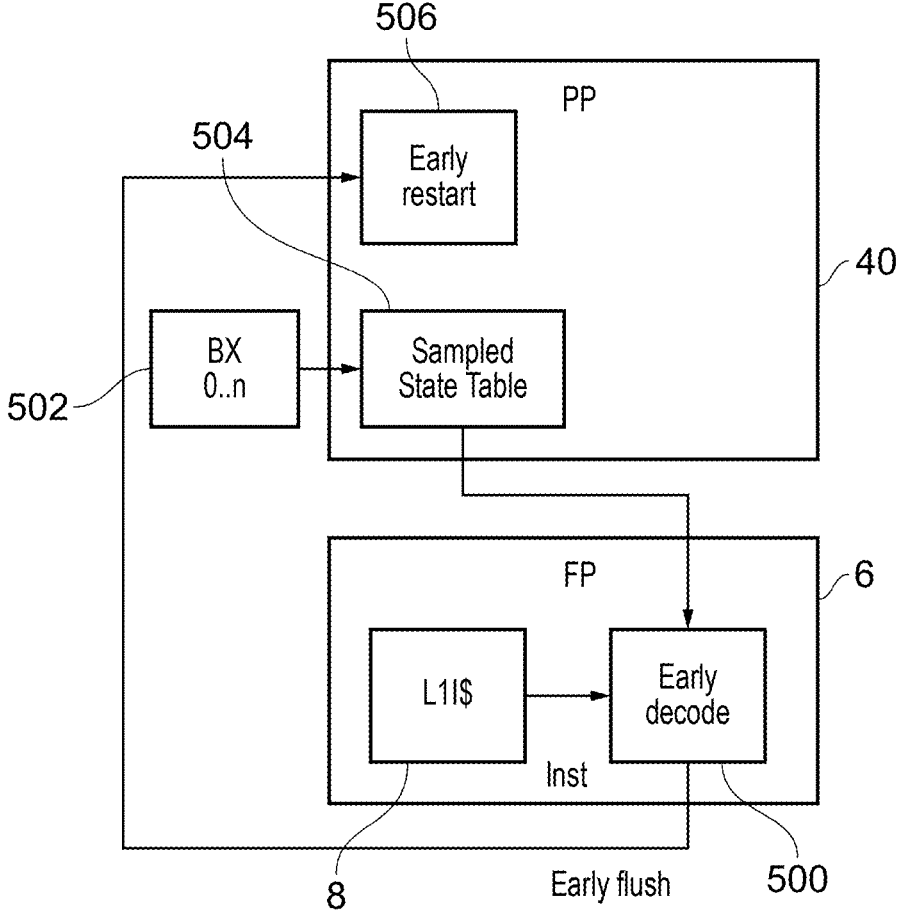
FIG. 5 illustrates an example apparatus according to an aspect of the present technique.

FIG. 5 provides an example arrangement for implementing prediction based on sampled register operands. FIG. 5 shows the branch predictor 40 and fetch stage 6 shown in FIG. 1. It will be appreciated that certain features are not shown, to increase clarity. The fetch stage 6 fetches instructions for decoding from the level 1 instruction cache 8, or more generally from the memory system (e.g., if the lookup in the cache misses, the instruction will be retrieved from a further level of memory such as level 2 cache 32 or memory 34). When a branch instruction is encountered, the fetch stage 6 may decide a next address from which to fetch instructions based on a predicted branch outcome provided by the branch predictor 40.

The circuitry comprises a sampled state table 504. Although shown as part of the branch predictor 40, it will be appreciated that the sampled state table may be provided elsewhere in the apparatus. The sampled state table 504 stores sampled values of register operands which have been sampled at a sampling point in program flow, such as in response to a misprediction of a branch instruction. The sampled state table may be provided in some examples with a limited number of bits to reduce area and power overhead (e.g., in one example the sampled state table provides 32 bits of storage). The sampled values may be provided to the sampled state table by sampling circuitry 502. In some examples, the values are sampled in response to mispredicted branches and therefore it may be branch resolution circuitry (which already has access to source and destination register operands of currently executing branch instructions) which provides sampled register values to the sampled state table.

The fetch stage 6 comprises early decode circuitry 500 (named because it may be provided at an earlier stage of processing than the decode stage 10, to enable predictions to be made earlier in the pipeline). The early decode circuitry 500 analyses the stream of instructions fetched by the fetch circuitry to determine whether the stream comprises a future branch instruction which depends on one of the register operands stored in the sampled state table 504, where the value of the register operand upon execution of that future branch instruction can be determined based on the value stored in the sampled state table 504 (i.e., an instruction which satisfies a semantic branch condition). This involves determining whether instructions between the sampling point and execution of the future branch instruction modify the register operands on which the future branch instruction depends, and if so, whether they do so in a way which can be determined (e.g., addition of an immediate, in which case the semantic branch condition may still be satisfied). In response to detecting a future branch instruction satisfying the semantic branch condition, this may indicate the semantic branch trigger. Prediction circuitry (provided in the branch predictor 40, in the early decode logic 500, or elsewhere) is responsive to the semantic branch trigger to calculate a predicted branch outcome for the future branch instruction based on the sampled register values in the sampled state table 504. In some examples, only the directly sampled values may be used (to reduce overhead associated with ALU logic discussed later).

During the period before the prediction based on the sampled register operands is calculated, instructions may have already been fetched into the processing pipeline using alternative prediction mechanisms. If it is determined that the alternative prediction for the future branch instruction was incorrect (based on the more accurate prediction made using sampled register operands), then an early flush may be issued to flush the incorrectly predicted instructions from the pipeline, and early restart circuitry 506 may be provided to cause instructions to be fetched from the correct flow path instead. Unlike a normal pipeline flush, which is issued when the branch instruction is determined to be incorrectly predicted when it reaches the execute stage, the early flush is issued when a predicted branch instruction may be at an earlier stage of the processing pipeline and therefore can enable correct instructions to be fetched earlier, reducing the impact on performance of a misprediction. In this example, overhead is low as only the additional sampled state table may be required, meaning that a low cost mechanism can be provided for avoiding back-to-back mispredictions by issuing an early flush when a first misprediction enables a second misprediction to be identified.

Figure 6:
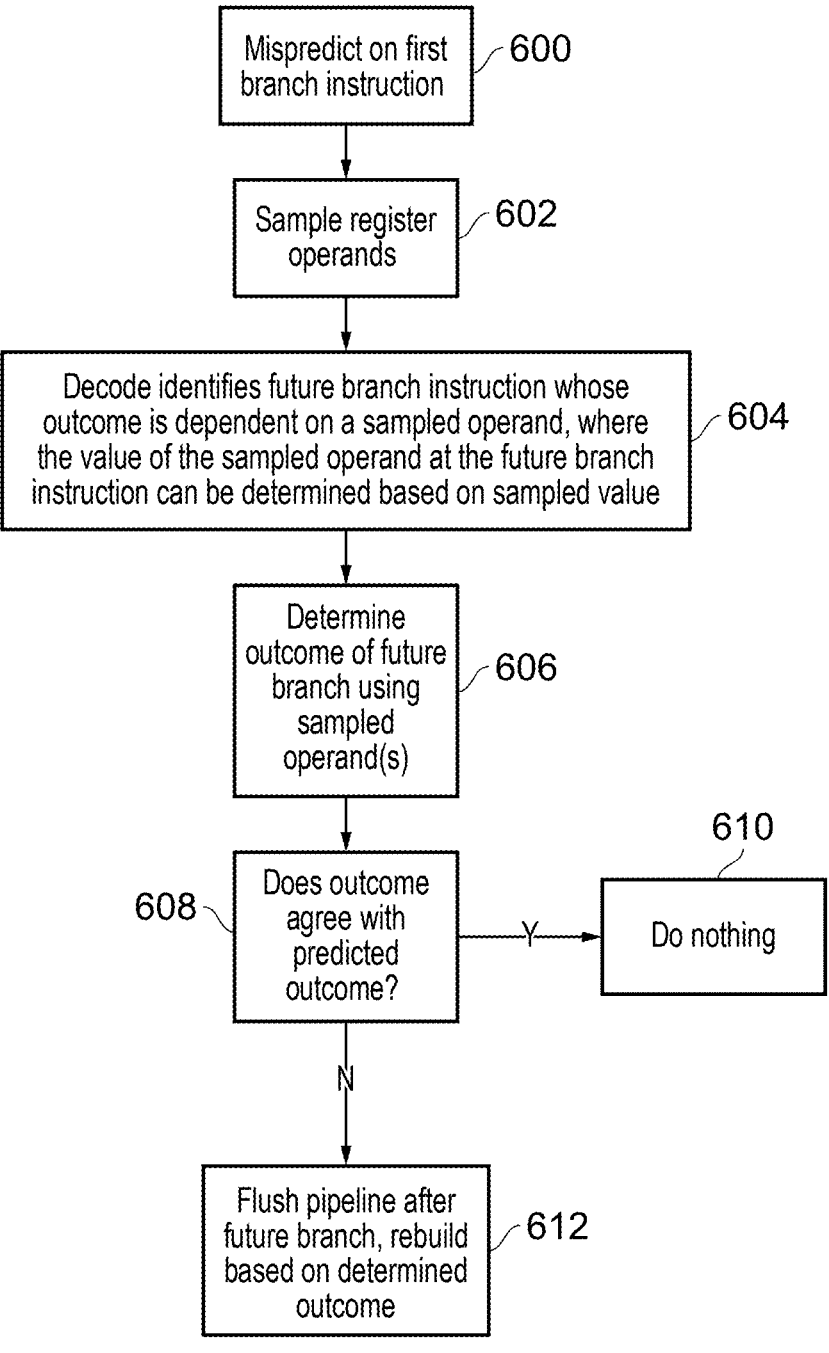
FIG. 6 illustrates a method of prediction according to an aspect of the present technique.

FIG. 6 is a flow diagram illustrating a method for making branch predictions using the apparatus shown in FIG. 5. At step 600 a first branch instruction may be determined to have been mispredicted, when the branch is resolved. This misprediction triggers sampling of register operands at step 602, which are stored to the sampled state table 504. The selection of sampled operands may include the source registers of the first mispredicted branch instruction.

At step 604, the early decode circuitry 500 identifies a future branch instruction satisfying the semantic branch condition, meaning that a prediction can be made for that future branch instruction using the values stored in the sampled state table 504. Therefore, at step 606 a prediction is made to determine the outcome of the future branch instruction using the sampled register operand values stored in the sampled state table 504.

The prediction of step 606 may be made after instructions have already been fetched into the pipeline based on an alternative prediction made for the future branch instruction using a different prediction mechanism. At step 608 it is determined whether the prediction made at step 606 agrees with the previous predicted branch outcome of the future branch instruction. If the two predictions agree, then instructions previously fetched into the processing pipeline were fetched on the correct flow path and therefore these should be allowed to proceed, meaning that at step 610 no action is taken.

If however the prediction of step 606 disagrees with the previous prediction, then at step 612 the portion of the pipeline following the future branch instruction is flushed, and instructions are fetched based on the outcome predicted in step 606 which is anticipated to be more accurate than the predicted outcome determined using other means.

Figure 7:
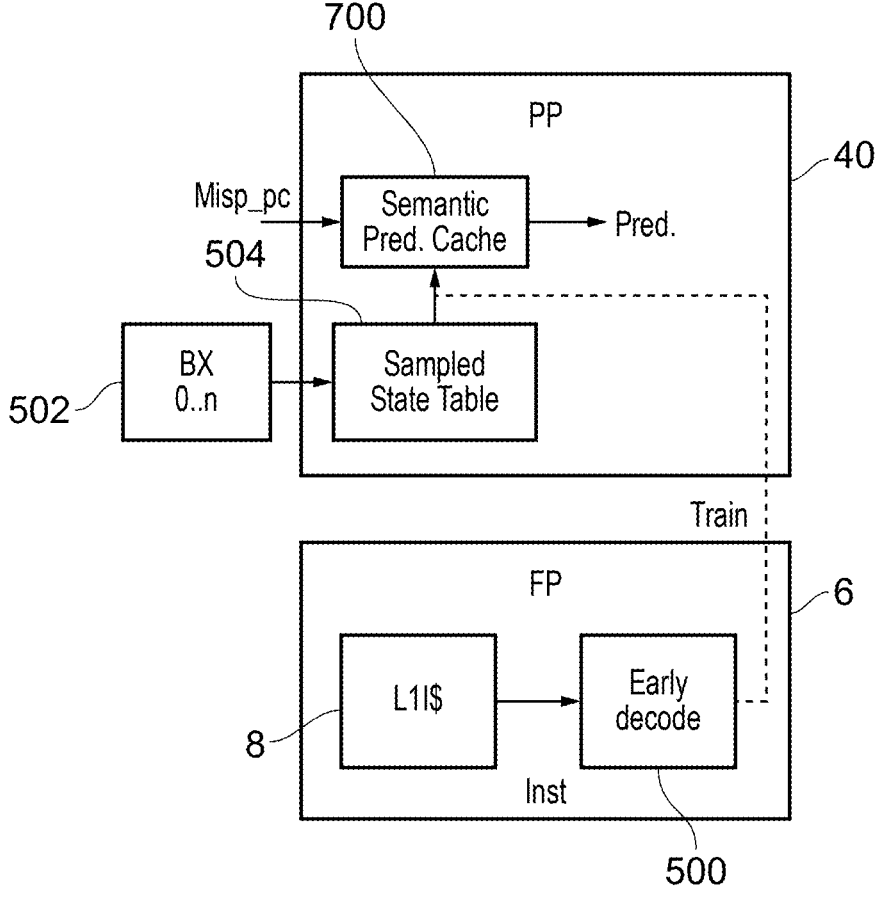
FIG. 7 illustrates an example apparatus according to an aspect of the present technique.

FIG. 7 provides a further example arrangement for implementing prediction based on sampled register operands. FIG. 7 shows the same pipeline stages as FIG. 5, and shares many of the same features (labelled alike). Compared to FIG. 5, FIG. 7 also includes a semantic prediction cache 700. The semantic prediction cache 700 comprises semantic prediction entries.

Figures 8, 9:
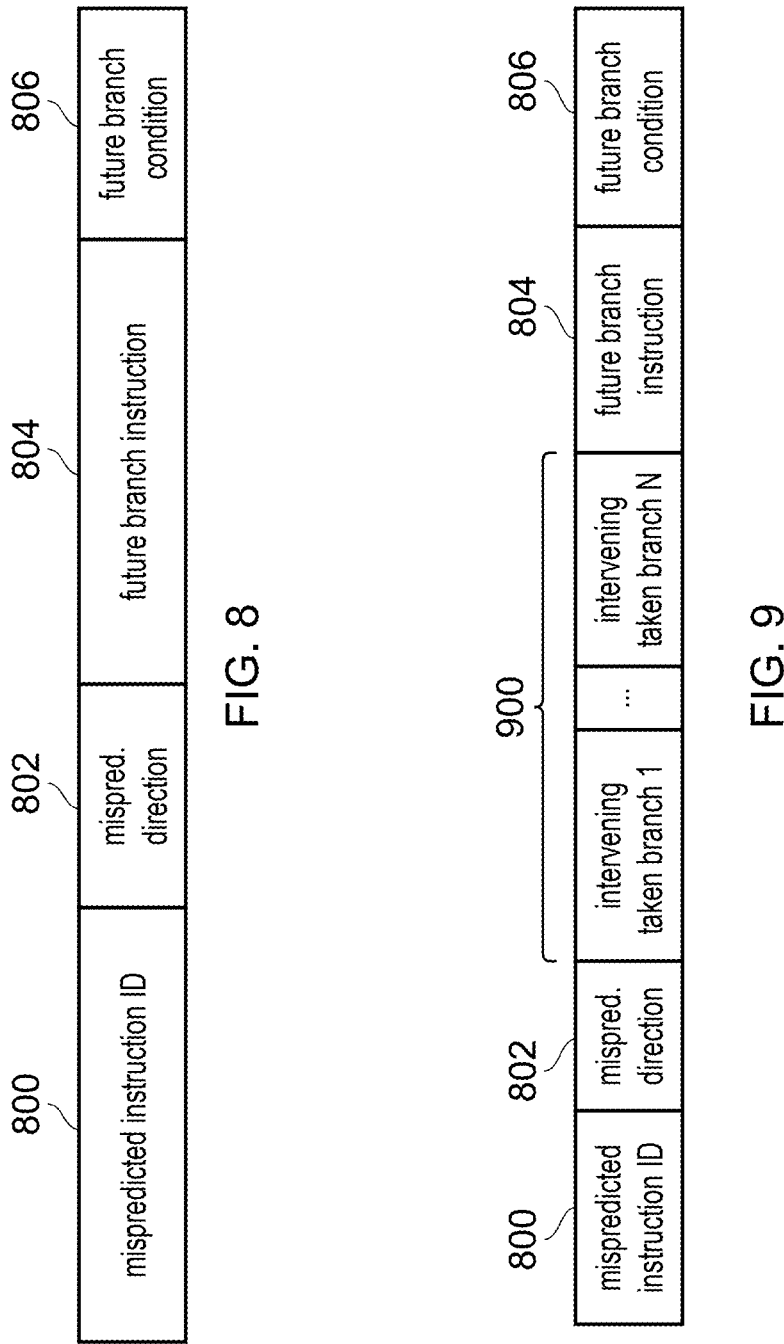
FIGS. 8 and 9 illustrate example encodings of a semantic prediction cache entry.

FIG. 8 provides an example encoding for a semantic prediction entry. As shown in FIG. 8, the semantic prediction entry may include a field 800 indicating a value for identifying a mispredicted branch instruction. This field may for example indicate the address of the mispredicted branch instruction. A further field 802 may also identify the mispredicted direction of the instruction indicated in field 800, so that up to two different entries may be provided for each branch instruction depending on which direction was mispredicted. The fields 800 and 802 enable an entry to be identified by looking up the semantic prediction cache 700 in response to a misprediction of a branch instruction. The semantic prediction entry also includes a field 804 indicating a future branch instruction which is anticipated to be encountered after misprediction of the first branch instruction indicated in field 800, and which is anticipated to satisfy the semantic branch condition meaning that its outcome can be predicted if register state is sampled at misprediction of the instruction in field 800. A field 806 may also be provided indicating the register operand upon which the future branch instruction is dependent, to allow the register operand to be sampled and to indicate which value should be used to make a prediction.

Returning to FIG. 7, the semantic prediction cache is looked up in response to misprediction of a branch instruction. This is shown by the input "misp_pc" provided to the prediction stage, which may include an address of a mispredicted branch instruction (which could be the address indicated by the current value of the program counter at the time of identifying the misprediction) provided, for example, by the execute stage. If the lookup hits in the cache then this indicates that state sampled on misprediction of the first instruction can be used to predict a future branch instruction. The sampled state table 504 is referenced to retrieve one or more sampled register values indicated by the field 806 of the hit entry, and those values are used to make a prediction of the branch outcome of the anticipated future branch instruction (without requiring that future branch instruction to have been fetched or decoded). Instructions following the future branch instruction in program flow can then be fetched based on the prediction made using the semantic prediction cache. The arrangement shown in FIG. 7 enables prediction of a future branch instruction earlier than the arrangement shown in FIG. 5, because the prediction can be started by the misprediction of the first branch instruction rather than by decoding the future branch instruction.

The semantic prediction cache 700 may be trained by early decode circuitry 500. The decode circuitry 500 may identify pairs of branch instructions in program flow (in a similar way to the decode circuitry 500 of FIG. 5) for which the second branch instruction satisfies the semantic branch condition. However, rather than triggering the semantic branch trigger in response to identifying the future branch instruction, the early decode circuitry 500 may instead create a new entry in the semantic prediction cache.

FIG. 9 illustrates a further example encoding of a semantic prediction entry of the semantic prediction cache 700. In the example of FIG. 9, the semantic prediction entry further includes at least one intervening branch indication field 900. The field(s) 900 may indicate addresses of intervening taken branches, to enable fetching of instructions after a future branch instruction separated from a sampling point by one or more intervening branch instructions. For example, without intervening branch instructions the fetch stage may fetch instructions consecutively following the mispredicted branch instruction until the future branch instruction is reached, after which instructions can be fetched based on the predicted outcome of the future branch instruction. However, if there are intervening taken branch instructions then addresses of fetched instructions will not be linear between the mispredicted instruction and the future branch instruction, and this may be indicated by the fields 900 of the semantic prediction entry to allow fetching of instructions even before the intervening instructions have been decoded.

Figures 10, 11:
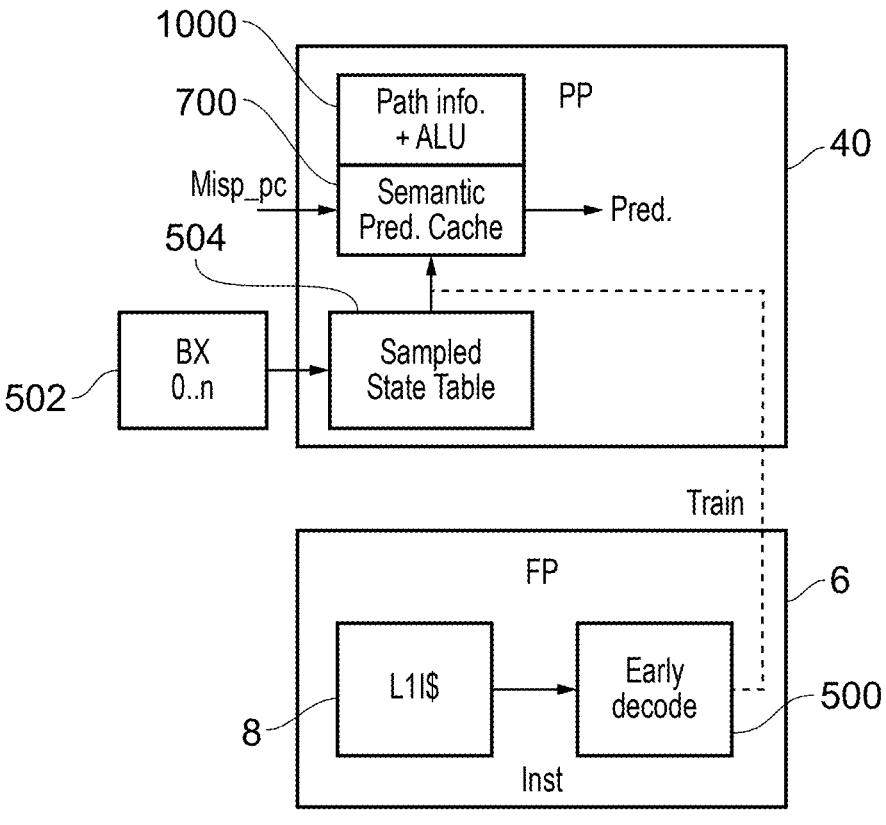
FIG. 10 illustrates an example apparatus according to an aspect of the present technique.
FIG. 11 illustrates an example encoding of a semantic prediction cache entry.

FIG. 10 provides a further example arrangement for implementing prediction based on sampled register operands. FIG. 10 shows the same elements as FIG. 7, with the addition of manipulation logic 1000 (shown in FIG. 10 as an arithmetic logic unit (ALU)).

The semantic prediction cache 700 according to the example of FIG. 10 stores entries having an encoding including one or more fields 1100 indicating an operand calculation. FIG. 11 illustrates an example encoding of an entry having an operand calculation indicating field 1100, with the remaining fields being the same as described above with reference to FIGS. 8 and 9.

An entry as shown in FIG. 11 enables prediction of a future branch instruction having an outcome depending on a manipulated value of a sampled register operand. For example, if a branch instruction has an outcome which depends on the value of register X0, and there is an intervening instruction between the sampling point and execution of that branch instruction which adds an immediate #imm to the value of register X0, then the manipulation logic 1000 may be employed to add #imm to the sampled value stored in the sampled state table 504 to enable prediction of the future branch instruction.

Figure 12:
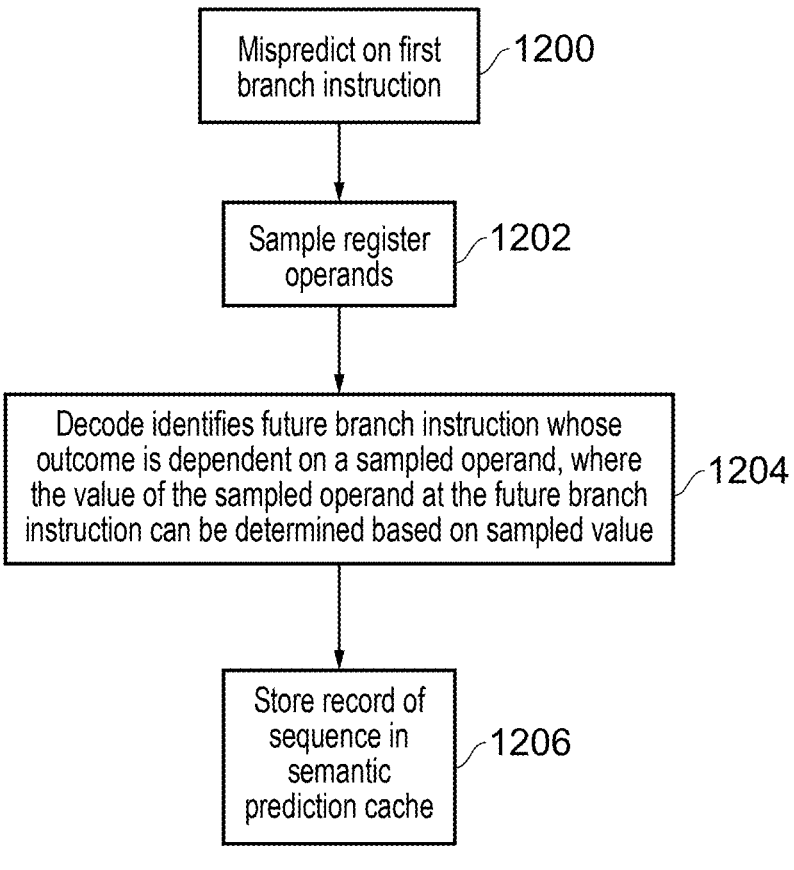
FIG. 12 illustrates a method of updating a semantic prediction cache.
Figure 13:
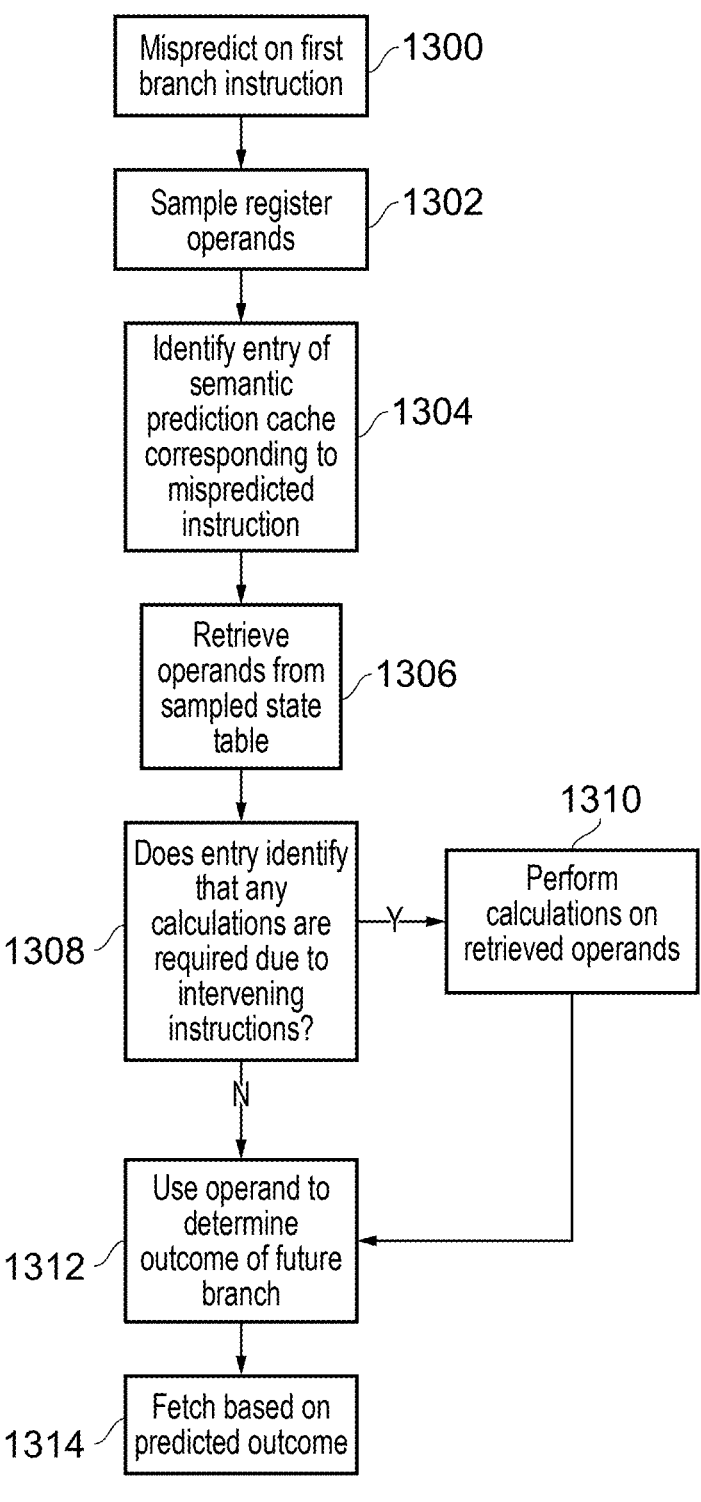
FIG. 13 illustrates a method of prediction using a semantic prediction cache.

FIGS. 12 and 13 illustrate methods for using the arrangements of FIGS. 7 and 10.

FIG. 12 illustrates a method for using early decode logic 500 to update entries of a semantic prediction cache 700. At step 1200, a first branch instruction is mispredicted. At step 1202, one or more register operands are sampled and their values are stored in the sampled state table 504. The sampled operand(s) may include operands upon which the first branch instruction depended, and/or source or destination registers of preceding instructions, for example.

The decode circuitry 500 continues to decode subsequently fetched instructions on the correct path following the first branch instruction, and at step 1204 identifies a future branch instruction having an outcome dependent on an operand sampled at step 1202, the value of which at the time of execution of the future branch instruction can be determined based on (i.e., is the same as, or can be calculated using) the sampled value of the operand. In other words, at step 1204, the decode circuitry identifies a future branch instruction satisfying the semantic branch condition.

At step 1206, in response to the identification of step 1204 an entry is created in the semantic prediction cache identifying the first branch instruction and the future branch instruction, so that upon future mispredictions of the first branch instruction it can be assumed that the future branch instruction will be encountered and a prediction can be performed in advance using the sampled register values.

FIG. 13 illustrates a method of making a prediction using the semantic prediction cache. At step 1300, a first branch instruction is mispredicted. The pipeline is flushed and, at step 1302, one or more register operands are sampled. Instructions on the correct execution path after the first branch instruction are fetched.

At step 1304, the semantic prediction cache is looked up using the address and address of the mispredicted first branch instruction. If no entry is identified then other branch prediction mechanisms may be used for upcoming branch instructions, or the method of FIG. 6 may be used to make a prediction using sampled register operands. However, if an entry is identified then that entry may be used to make a prediction for an upcoming future branch instruction.

At step 1306, operands indicated by the hit entry of the semantic prediction cache are retrieved from the sampled state table. At step 1308, it is determined whether the hit entry indicates that any manipulations of the sampled register values are required due to intervening instructions between the sampling point and execution of the future branch instruction (in the example of FIG. 10, in the example of FIG. 7 this step is skipped). If so, then at step 1310 calculation logic 1000 is used to manipulate the sampled register operands to determine what values those register operands will have at the time the future branch instruction is executed.

In either case, at step 1312 the operands are used to determine the outcome of the future branch instruction. For example, if the instruction is a compare and branch if zero instruction then it is determined whether the sampled operand is zero. At step 1314, instructions following the future branch instruction can then be fetched based on the outcome predicted at step 1314.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 14:
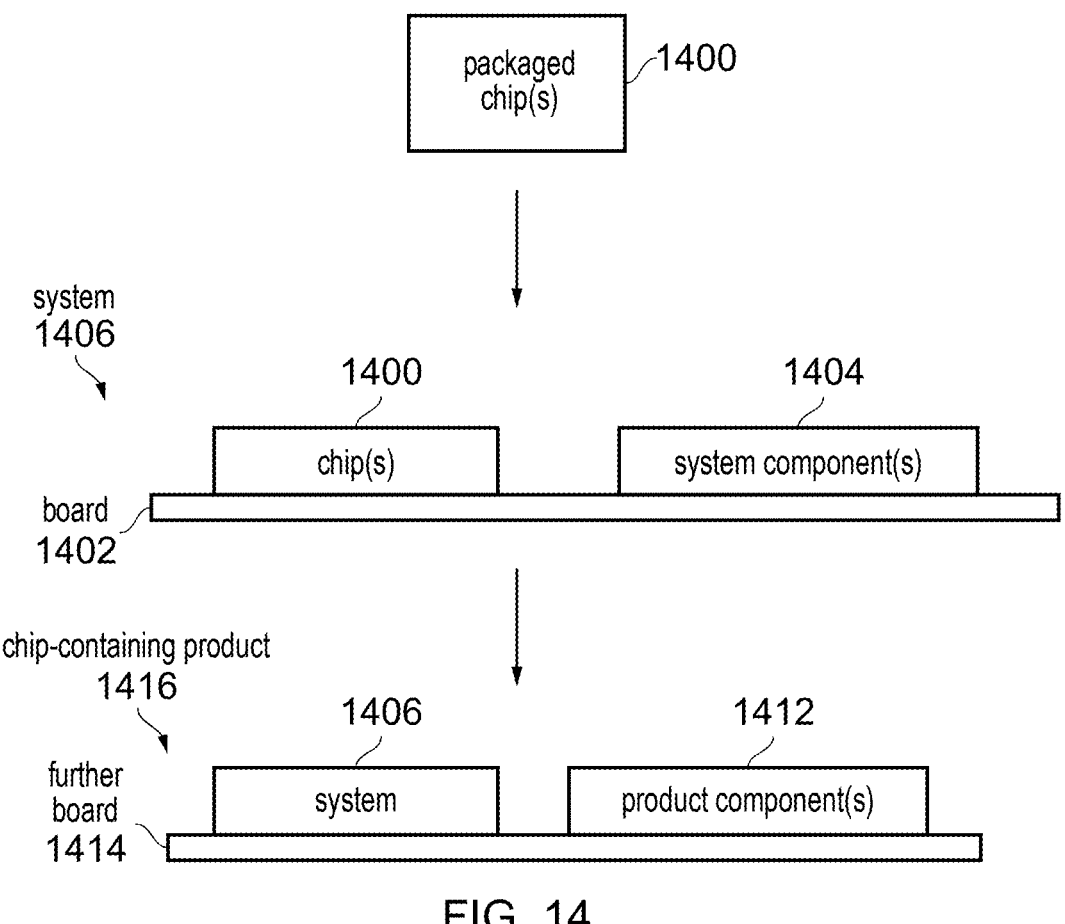
FIG. 14 illustrates a system and a chip-containing product.

As shown in FIG. 14, one or more packaged chips 1400, with the apparatus described above implemented on one chip or distributed over two or more of the chips, are manufactured by a semiconductor chip manufacturer. In some examples, the chip product 1400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 1400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. chips which form part of a larger chip and which are manufactured separately) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 1400 are assembled on a board 1402 together with at least one system component 1404 to provide a system 1406. For example, the board may comprise a printed circuit board. The board substrate may be made of any of a variety of materials, e.g. plastic, glass, ceramic, or a flexible substrate material such as paper, plastic or textile material. The at least one system component 1404 comprise one or more external components which are not part of the one or more packaged chip(s) 1400. For example, the at least one system component 1404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 1416 is manufactured comprising the system 1406 (including the board 1402, the one or more chips 1400 and the at least one system component 1404) and one or more product components 1412. The product components 1412 comprise one or more further components which are not part of the system 1406. As a non-exhaustive list of examples, the one or more product components 1412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 1406 and one or more product components 1412 may be assembled on to a further board 1414.

The board 1402 or the further board 1414 may be provided on or within a device housing or other structural support (e.g. a frame or blade) to provide a product which can be handled by a user and/or is intended for operational use by a person or company.

The system 1406 or the chip-containing product 1416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus, comprising:

sampled state storage configured to store sampled values of at least one register operand sampled at a sampling point in program flow; and prediction circuitry, wherein in response to a semantic branch trigger indicating that there is a future branch instruction at a point in program flow later than the sampling point which satisfies a semantic branch condition, the prediction circuitry is configured to make a determination of the branch outcome of the future branch instruction based on the sampled value of a particular register operand, wherein the semantic branch condition is satisfied by a future branch instruction for which:

a branch outcome of the future branch instruction is dependent on the particular register operand which is one of the at least one register operands for which a sampled value is stored in the sampled state storage, and a value that the particular register operand will have when program flow reaches the future branch instruction can be determined based on the sampled value of the particular register operand sampled at the sampling point.

(2) The apparatus according to clause 1, wherein sampling of the at least one register operand is triggered by misprediction of a first branch instruction.

(3) The apparatus according to clause 2, wherein the branch outcome of the first branch instruction is dependent on the particular register operand upon which the branch outcome of the future branch instruction is also dependent.

(4) The apparatus according to any preceding clause, wherein the at least one register operand comprises a status register for storing condition flags.

(5) The apparatus according to clause 4, wherein at least one of the condition flags indicates an outcome of a compare instruction.

(6) The apparatus according to any preceding clause, wherein the prediction circuitry is configured to treat as the particular register operand at least one of a source register and destination register of an instruction preceding the sampling point in the program flow.

(7) The apparatus according to any preceding clause, comprising decoding circuitry configured to decode a series of instructions following the sampling point in program flow and make a determination of whether the series of instructions comprises a future branch instruction satisfying the semantic branch condition;

wherein the decoding circuitry is configured to trigger the semantic branch trigger in response to determining that the series of instructions comprises the future branch instruction satisfying the semantic branch condition.

(8) The apparatus according to clause 7, wherein the decoding circuitry is configured to decode instructions at a decode stage of a processing pipeline; and the decoding circuitry is configured to trigger a pipeline flush in response to determining that the determination of the branch outcome of the future branch instruction provided by the prediction circuitry conflicts with a separate predicted branch outcome of the future branch instruction on the basis of which fetch circuitry has fetched instructions into the processing pipeline.

(9) The apparatus according to any preceding clause, comprising a semantic prediction cache configured to store at least one semantic prediction entry identifying a first branch instruction and a future branch instruction, wherein the outcome of the future branch instruction can be determined based on sampled values of at least one register operand sampled on misprediction of the first branch instruction.

(10) The apparatus according to clause 9, comprising lookup circuitry configured to perform a lookup in the semantic prediction cache in response to misprediction of a first branch instruction, wherein the lookup circuitry is configured to trigger the semantic branch trigger in response to the lookup hitting in the semantic prediction cache.

(11) The apparatus according to any of clauses 9 and 10, comprising decoding circuitry configured to decode a series of instructions of a program and make a determination of whether the series of instructions comprises a first branch instruction followed by a future branch instruction which, for a sampling point occurring on program flow reaching the first branch instruction, satisfies the semantic branch condition;

wherein the decoding circuitry is configured to update the semantic prediction cache in response to determining that the series of instructions comprises said first branch instruction followed by said future branch instruction.

(12) The apparatus according to any of clauses 9 to 11, wherein an encoding of the semantic prediction entry enables indication of intervening taken branches occurring between the first branch instruction and the future branch instruction in program flow.

(13) The apparatus according to any preceding clause, comprising value manipulation circuitry to manipulate the sampled values of the at least one register operand to determine the value that the particular register operand will have when program flow reaches the future branch instruction.

(14) The apparatus according to clause 13, wherein the value manipulation circuitry comprises at least one of: logical shift logic and addition/subtraction logic.

(15) The apparatus according to any of clauses 13 and 14, comprising a semantic prediction cache configured to store at least one semantic prediction entry identifying a first branch instruction and a future branch instruction, wherein the outcome of the future branch instruction can be determined based on sampled values of at least one register operand sampled on misprediction of the first branch instruction, wherein an encoding of the semantic prediction entry enables indication of at least one manipulation to be performed by the value manipulation circuitry.

(16) The apparatus according to any preceding clause, wherein the prediction circuitry is configured to make a determination of the branch outcome of the future branch instruction based on sampled values of a plurality of register operands.

(17) A non-transitory computer-readable medium to store computer-readable code for fabrication of the apparatus of any preceding clause.

(18) A system comprising:

the apparatus of any preceding clause, implemented in at least one packaged chip;

at least one system component; and a board, wherein the at least one packaged chip and the at least one system component are assembled on the board.

(19) A chip-containing product comprising the system of clause 18 assembled on a further board with at least one other product component.

(20) A method, comprising:

storing sampled values of at least one register operand sampled at a sampling point in program flow; and in response to a semantic branch trigger indicating that there is a future branch instruction at a point in program flow later than the sampling point which satisfies a semantic branch condition, making a determination of the branch outcome of the future branch instruction based on the sampled value of a particular register operand, wherein the semantic branch condition is satisfied by a future branch instruction for which:

a branch outcome of the future branch instruction is dependent on the particular register operand which is one of the at least one register operands for which a sampled value is stored in the sampled state storage, and a value that the particular register operand will have when program flow reaches the future branch instruction can be determined based on the sampled value of the particular register operand sampled at the sampling point.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:

sampled state storage configured to store sampled register values of at least one register operand sampled at a sampling point in program flow; and prediction circuitry, wherein in response to a semantic branch trigger indicating that there is a future branch instruction at a point in program flow later than the sampling point which satisfies a semantic branch condition, the prediction circuitry is configured to make a determination of a branch outcome of the future branch instruction based on a sampled register value of a particular register operand, wherein the semantic branch condition is satisfied by a given future branch instruction for which:

a branch outcome of the given future branch instruction is dependent on a given register operand which is one of the at least one register operands for which a sampled register value is stored in the sampled state storage, and a value that the given register operand will have when program flow reaches the given future branch instruction can be calculated deterministically based on the sampled register value of the given register operand sampled at the sampling point.

2. The apparatus according to claim 1, wherein sampling of the at least one register operand is triggered by misprediction of a first branch instruction.

3. The apparatus according to claim 2, wherein a branch outcome of the first branch instruction is dependent on the particular register operand upon which the branch outcome of the future branch instruction is also dependent.

4. The apparatus according to claim 1, wherein the at least one register operand comprises a status register for storing condition flags.

5. The apparatus according to claim 4, wherein at least one of the condition flags indicates an outcome of a compare instruction.

6. The apparatus according to claim 1, wherein the prediction circuitry is configured to treat at least one of a source register and destination register of an instruction preceding the sampling point in program flow as the particular register operand.

7. The apparatus according to claim 1, comprising decoding circuitry configured to decode a series of instructions following the sampling point in program flow and make a determination of whether the series of instructions comprises the future branch instruction satisfying the semantic branch condition;

wherein the decoding circuitry is configured to trigger the semantic branch trigger in response to determining that the series of instructions comprises the future branch instruction satisfying the semantic branch condition.

8. The apparatus according to claim 7, wherein the decoding circuitry is configured to decode instructions at a decode stage of a processing pipeline; and the decoding circuitry is configured to trigger a pipeline flush in response to determining that the determination of the branch outcome of the future branch instruction provided by the prediction circuitry conflicts with a separate predicted branch outcome of the future branch instruction on the basis of which fetch circuitry has fetched instructions into the processing pipeline.

9. The apparatus according to claim 1, comprising a semantic prediction cache configured to store at least one semantic prediction entry identifying a first branch instruction and the future branch instruction, wherein the branch outcome of the future branch instruction can be calculated deterministically based on sampled register values of at least one register operand sampled on misprediction of the first branch instruction.

10. The apparatus according to claim 9, comprising lookup circuitry configured to perform a lookup in the semantic prediction cache in response to misprediction of the first branch instruction, wherein the lookup circuitry is configured to trigger the semantic branch trigger in response to the lookup hitting in the semantic prediction cache.

11. The apparatus according to claim 9, comprising decoding circuitry configured to decode a series of instructions of a program and make a determination of whether the series of instructions comprises the first branch instruction followed by the future branch instruction which, for a sampling point occurring on program flow reaching the first branch instruction, satisfies the semantic branch condition;

wherein the decoding circuitry is configured to update the semantic prediction cache in response to determining that the series of instructions comprises said first branch instruction followed by said future branch instruction.

12. The apparatus according to claim 9, wherein an encoding of the semantic prediction entry enables indication of intervening taken branches occurring between the first branch instruction and the future branch instruction in program flow.

13. The apparatus according to claim 1, comprising value manipulation circuitry to manipulate the sampled register values of the at least one register operand to determine the value that the particular register operand will have when program flow reaches the future branch instruction.

14. The apparatus according to claim 13, wherein the value manipulation circuitry comprises at least one of: logical shift logic and addition/subtraction logic.

15. The apparatus according to claim 13, comprising a semantic prediction cache configured to store at least one semantic prediction entry identifying a first branch instruction and the future branch instruction, wherein the branch outcome of the future branch instruction can be calculated deterministically based on sampled register values of at least one register operand sampled on misprediction of the first branch instruction, wherein an encoding of the semantic prediction entry enables indication of at least one manipulation to be performed by the value manipulation circuitry.

16. The apparatus according to claim 1, wherein the prediction circuitry is configured to make a determination of the branch outcome of the future branch instruction based on sampled register values of a plurality of register operands.

17. A non-transitory computer-readable medium having stored thereon computer-readable code that specifies the apparatus of claim 1 in a format recognized by a fabrication system that is configured to use the computer-readable code to fabricate the apparatus of claim 1.

18. A system comprising:

the apparatus of claim 1, implemented in at least one packaged chip;

at least one system component; and a board, wherein the at least one packaged chip and the at least one system component are assembled on the board.

19. A chip-containing product comprising the system of claim 18 assembled on a further board with at least one other product component.

20. A method, comprising:

storing sampled register values of at least one register operand sampled at a sampling point in program flow;

detecting a semantic branch trigger indicating that there is a future branch instruction at a point in program flow later than the sampling point which satisfies a semantic branch condition; and in response to the semantic branch trigger, making a determination of a branch outcome of the future branch instruction based on a sampled register value of a particular register operand, wherein the semantic branch condition is satisfied by a given future branch instruction for which:

a branch outcome of the given future branch instruction is dependent on a given register operand which is one of the at least one register operand, for which a sampled register value is stored, and a value that the given register operand will have when program flow reaches the given future branch instruction can be calculated deterministically based on the sampled register value of the given register operand sampled at the sampling point.

* * * * *